(12) United States Patent
Shukla et al.

(10) Patent No.: US 12,443,747 B2
(45) Date of Patent: Oct. 14, 2025

(54) SENSITIVE DATA LEAK-DETECTION ENGINE IN A SECURITY MANAGEMENT SYSTEM

(71) Applicant: Microsoft Technology Licensing, LLC, Redmond, WA (US)

(72) Inventors: Abhishek Shukla, Redmond, WA (US); Wing Kwong Wan, Redmond, WA (US); Jie Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 258 days.

(21) Appl. No.: 18/083,767

(22) Filed: Dec. 19, 2022

(65) Prior Publication Data

US 2024/0202359 A1 Jun. 20, 2024

(51) Int. Cl.
*G06F 21/62* (2013.01)

(52) U.S. Cl.
CPC .............. *G06F 21/6245* (2013.01)

(58) Field of Classification Search
CPC ...... G06F 21/54; G06F 21/563; G06F 21/577; G06F 21/6245; G06F 2221/033
See application file for complete search history.

(56) References Cited

U.S. PATENT DOCUMENTS

| | | | |
|---|---|---|---|
| 2013/0312102 A1* | 11/2013 | Brake | H04L 63/1433 726/25 |
| 2021/0312082 A1* | 10/2021 | Conikee | G06F 21/577 |
| 2022/0222370 A1* | 7/2022 | Bastide | G06F 21/577 |

OTHER PUBLICATIONS

International Search Report and Written Opinion received for PCT Application No. PCT/US23/081225, Mar. 19, 2024, 15 pages.
Jason Cohen, "New Blog Post I What's new: Detect credential leaks using built-in Azure Sentinel notebooks", Retrieved from-https://techcommunity.microsoft.com/t5/microsoft-sentinel/new-blog-post-what-s-new-detect-credential-leaks-using-built-in/m-p/2409407, Jun. 2, 2021, 1 page.

(Continued)

*Primary Examiner* — Theodore C Parsons
(74) *Attorney, Agent, or Firm* — Shook, Hardy & Bacon L.L.P.

(57) ABSTRACT

Methods, systems, and computer storage media for providing a sensitive data scanning in a sensitive data leak-detection engine of a security management system. Sensitive data scanning—for example confidential information scanning or credential scanning—provides sensitive data leak-detection via a software development environment during a software development process. In operation, a request—to execute a sensitive data scanning operation on an instance of in-development code—is accessed. The sensitive data scanning operation executable via a sensitive data leak-detection engine that provides code security management services in a software development environment. A code scanning package is accessed. The code scanning package comprises software development environment code scanning parameters. Based on the software development environment code scanning parameters, the in-development code is scanned for sensitive data. A notification comprising a sensitive data scan result associated with the in-development code is generated. The notification is communicated to cause the notification to be displayed.

20 Claims, 12 Drawing Sheets

(56) References Cited

OTHER PUBLICATIONS

Vickie Li, "Detecting Sensitive Data Leaks That Matter", ShiftLeft Blog, Retrieved from-https://blog.shiftleft.io/detecting-sensitive-data-leaks-that-matter-42f7530f5f6d, Mar. 17, 2021, 8 pages.
International Preliminary Report on Patentability (Chapter I) received for PCT Application No. PCT/US23/081225, mailed on Jul. 3, 2025, 09 pages.

* cited by examiner

SecurityTools / Prototype / Repos / Pull requests / Sensitive Data ScanLogger

Search

Test Logger
Active 112345 @ John Smith
Overview  Files  Updates  Commits

Approve  >  Complete  >

⊘ No merge conflicts
  Last checked Just now

Reviewers
Required
  No required reviewers    Add >
Optional
  No optional reviewers    +

Description
This pull request is automatically created by the Sensitive Data Leak-Detection Engine to scan for sensitive data associated with code during development and testing. This allows early detection and mitigation of sensitive data leaks. For more information, please visit https://url.com

102C

Tags
  No tags    +

Show everything (1) >

@ Add a comment...

Just now

Work Items
  No work items    +

FIG. 1D

SENSITIVE DATA LEAK-DETECTION ENGINE IN A SECURITY MANAGEMENT SYSTEM

BACKGROUND

Software developers create computer software or applications using programming languages. Software development refers to the process of conceiving, specifying, designing, programming, documenting, testing, and bug fixing software components, applications, and frameworks. In particular, software development can be based on a secure software development process for creating software that involves security management systems (e.g., code security management services and functionality) into the software development. Static application security testing can be used to secure software by reviewing the source code of the software to identify sources of vulnerabilities. For example, a static code analysis tool can be used to flag programming errors, bugs, stylistic errors, and suspicious constructs.

Conventionally, security management systems are not configured with a comprehensive computing logic and infrastructure to efficiently provide adequate sensitive data leak-detection. Such security management systems may operate with a security management infrastructure ("infrastructure") that is limited because the infrastructure lacks seamless evaluation of code for sensitive data leaks. Moreover, software developers can be busy and a solution that requires deviation from routine software development processes does not efficiently address infrastructure limitations or provide security management functionality that is effectively integrated with the software development process. As such, a more comprehensive security management system—with an alternative basis for performing secure management operations—can improve computing operations and interfaces in security management systems.

SUMMARY

Various aspects of the technology described herein are generally directed to systems, methods, and computer storage media for, among other things, providing sensitive data scanning in a sensitive data leak-detection engine of a security management system. Sensitive data scanning—for example, credential scanning or confidential information scanning—provides sensitive data leak-detection via a software development environment during a software development process. Sensitive data scanning is provided using a sensitive data leak-detection engine that is operationally integrated in the security management system of a software development environment system. The security management system supports a security management framework of computing components associated with the software development process. The sensitive data leak-detection engine operates to provide detection of sensitive data leaks based on a mock library for a common logger. For example, a software developer—via an automated onboarding process for sensitive data leak-detection into a software development environment—can seamlessly execute sensitive data leak-detection operations at a unit testing stage of the software development process.

Conventionally, security management systems are not configured with a comprehensive computing logic and infrastructure to efficiently provide adequate sensitive data leak-detection. For example, static application security testing tools do not provide integrated sensitive data leak-detection—especially with large-scale software development infrastructures with a diversity of software developers, software development tools, and software development processes. Moreover, credential leaks—associated with telemetry and logging data—can implicate significant computing costs to detect such leaks in production systems because of the log volume associated with production software or applications.

Security management functionality for sensitive data leak-detection that is not conventionally seamlessly integrated into a software development process. A security management framework will lack software developer adoption if not properly integrated with the software development process—and effectively operates inefficiently to address sensitive data leak-detection. A technical solution—to the limitations of conventional security management systems—can include the challenge of developing sensitive data scanning associated with a sensitive data leak-detection engine that provides sensitive data leak-detection in a security management system.

In operation, a request—to execute a sensitive data scanning operation on an instance of in-development code—is accessed. The sensitive data scanning operation executable via a sensitive data leak-detection engine that provides code security management services in a software development environment. The code security management services include generating a code scanning package, automatically onboarding instances of in-development code, and scanning instances of in-development code during a development stage of a software development process. The code scanning package is accessed. The code scanning package comprises software development environment code scanning parameters. Based on the software development environment code scanning parameters, the in-development code is scanned for sensitive data. A notification comprising a sensitive data scan result associated with the in-development code is generated. The notification is communicated to cause the notification to be displayed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIG. 1C-1E are security management system interfaces of an exemplary security management system for providing sensitive data scanning in a sensitive data leak-detection engine, in accordance with aspects of the technology described herein;

DETAILED DESCRIPTION OF THE INVENTION

Overview

Figure 1A:
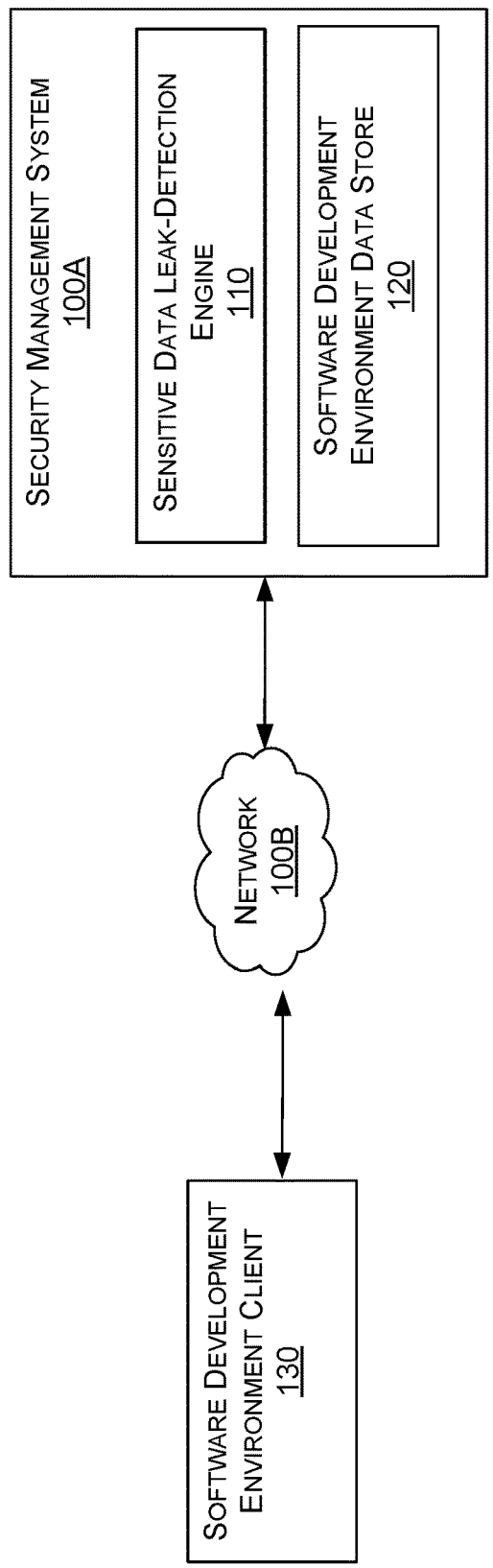
FIGS. 1A and 1B are block diagrams of an exemplary security management system for providing sensitive data scanning in a sensitive data leak-detection engine, in accordance with aspects of the technology described herein.

A software development environment or software development environment system is a collection of hardware and software tools that a system developer uses to build software systems. A software development environment provides a platform with an intelligent set of tools to help software developers program applications. For example, a software development environment can: include a programming Graphical User Interface (GUI) or text editor; provide integration with one or more platforms; and expose a platform's Application Programming Interface (API) for compiling, version control, code suggestions, debugging, and deployment.

A software development environment can support telemetry functionality that includes logging software code and analyzing events associated with the software code. Telemetry data (e.g., logging data) may be generated at least in part based on sensitive data (e.g., confidential information or credential information). For example, credentials—that verify identity or provide authentication—help confirm a user's identity in relation to different types of computing systems, such as applications or computer networks. API keys can be used to control the utilization of API interfaces and access to API interfaces can be tracked via telemetry. User data (e.g., confidential data) may also be processed through logging data of telemetry. As such, telemetry features may inadvertently expose sensitive data—sometimes referred to as a sensitive data leak or a credential leak. Sensitive data leaks are a security risk because sensitive data leaks may lead to loss of control of access to information. Security management systems or tools can support controlling access to sensitive data.

Conventionally, security management systems are not configured with a comprehensive computing logic and infrastructure to efficiently provide adequate sensitive data leak-detection. For example, bad actors gain access to sensitive data via conventional security management systems implemented in production systems through credential leaks (e.g., compromised usernames and passwords). Computationally, it is expensive to detect sensitive data leaks in production systems because detecting and pinpointing a sensitive data leak is computationally challenging, and copies of logging data are stored in multiple data stores. And, securing against sensitive data leaks—via conventional security management systems associated with production environments—increase risk of external sensitive data leaks when credentials are already logged in production (e.g., telemetry logging data). Such security management systems may operate with a security management infrastructure that is limited because it lacks seamless evaluation of code for sensitive data leaks.

Moreover, software developers can be busy and a solution that requires deviation from routine software development processes does not efficiently address security management infrastructure limitations or provide ample security management functionality that is effectively integrated with the software development process. As such, a more comprehensive security management system—with an alternative basis for performing secure management operations—can improve computing operations and interfaces in security management systems.

Embodiments of the present invention are directed to systems, methods, and computer storage media for, among other things, providing sensitive data scanning in a sensitive data leak-detection engine of a security management system. Sensitive data scanning—for example, credential scanning—provides sensitive data leak-detection via a software development environment during a software development process. Sensitive data scanning (e.g., via a sensitive data scanning operation) is provided using a sensitive data leak-detection engine that is operationally integrated in the security management system of a software development environment system. The security management system supports a security management framework of computing components associated with the software development process. The sensitive data leak-detection engine operates to provide detection of sensitive data leaks based on a mock library for a common logger. For example, a software developer—via an automated onboarding process for sensitive data leak-detection in a software development environment—can seamlessly execute sensitive data leak-detection operations at a unit testing stage of the software development process.

At a system level, a software development environment includes a security management system that supports providing secure data leak-detection. The security management system specifically implements a shift left security management framework that prevents defects early in the software development process. In particular, the security management system provides secure data scanning operations during a development stage or testing stage (e.g., unit testing) of software code (e.g., in-development software code). For example, credentials associated with in-development code can be detected in a development environment or testing environment of a software developer as part of testing interfaces, operations, and infrastructure of a software development environment. Advantageously, the security management system protects against sensitive data leaks (e.g., credential leaks) obviating computationally expensive operations (e.g., scanning code at build stage of the software development process).

In the software development environment, the security management system implements the security management framework based on computing components—including a software development environment data store, a security data leak-detection engine having a logging framework, a code scanning package, and an onboarding engine. The software development environment data store refers to a repository of instances of in-development code that can be scanned for sensitive data. The security data leak-engine refers to a combination of tools including the logging framework with a sensitive data scanning mock library, an onboarding engine, and a code scanning package. In this way, the computing components of the security management system are integrated into the software development process at the development stage or the testing stage to preemptively and efficiently identify sensitive data leaks.

The logging framework provides logging that refers to recording of activity associated with software code or an application. The logging framework can be a common logger for different types of repositories or instances of in-development code. The logging framework includes a sensitive data scanning mock library to support scanning in-development code for sensitive data. For example, sensitive data scanning mock library can be for credentials where the mock library focuses on identifying potential credential leaks in logging data. The logging framework can be used to develop the code scanning package with software development environment code scanning parameters such that the code scanning package is executed in the software development environment.

The security management system implements an onboarding process to automatically configure a software development environment client for secure data leak-detection. The onboarding process integrates the code scanning package with a code repository or an instance of in-development code. In particular, lines of code (e.g., code scanning parameters, code scanning package reference-code, sensitive data scanning onboarding code)—that reference the code scanning package for performing sensitive data leak-detection operations—are added to the in-development code. The onboarding process can include employing an onboarding engine to automatically communicate pull requests for repositories in the software development environment data store. Onboarding requests can be published to different repositories, such that, sensitive data scanning onboarding code—associated with a code scanning package—is initialized with in-development code to support sensitive data scanning operations during the development stage or the testing stage.

Operationally, a code scanning package (e.g., a NuGet package) can be developed to support executing the sensitive data leak-detection operations. The code scanning package can contain compiled code (as DLL) along with content—associated with sensitive data scanning onboarding code and the security data leak-detection engine client—that is needed to execute the code scanning package. The sensitive data scanning onboarding code and the security data leak-detection engine client can provide code and files that support referencing the code scanning package in the in-development code to execute the sensitive data leak-detection.

The sensitive data leak-detection engine—using the logging framework, onboarding engine, and code scanning package, operates as a tool that identifies leaks in code and other related files. The sensitive data leak-detection engine can specifically be a credential scanner that identifies different types of credentials (e.g., default passwords, SQL connection strings, and certificates with private keys). The sensitive data leak-detection engine (e.g., the credential scanner) can be periodically updated to provide the most up-to-date code scanning features. For example, a version upgrade can be performed to the sensitive data leak-detection engine independently of other computing components of the software development environment. In this way, the in-development code simply accesses the code scanning features with limited interference or interruption to a software developer's routine process. The sensitive data leak-detection engine will identify sensitive data, for example, generate an exception that is communicated to the software development client. Moreover, the software development client can provide a security management system interface that supports onboarding, executing the sensitive data scanning operation, and reviewing sensitive data scan results.

Advantageously, the embodiments of the present invention include several inventive features (e.g., operations, systems, engines, and components) associated with a security management system having the sensitive data leak-detection engine. Inventive features will be described with reference to operations for providing a sensitive data scanning in sensitive data leak-detection engine in a security management system. Functionality of the embodiments of the present invention will further be described, by way of an implementation and anecdotal examples, to demonstrate that the operations—generating a code scanning package, automatically onboarding repositories for software development environment clients to perform sensitive data scanning, and executing sensitive data scanning for instances of in-development code—are a solution to a specific problem in a software development environment to improve computing operations and interface for security management systems. For example, the operations provide sensitive data scanning services for software development during a development stage and testing stage. Overall, these improvements result in less CPU computation, smaller memory requirements, and increased flexibility in search systems.

Aspects of the technical solution can be described by way of examples and with reference to FIGS. 1A-1G. FIG. 1A illustrates a software development environment (system) 100 and security management system 100A. The security management system 100A includes network 110B, sensitive data leak-detection engine 110, software development environment data store 120, and sensitive development environment client 130.

The software development environment 100 provides a computing workspace with programming tools used to develop source code for an application or software product. The software development environment 100 can be part of a cloud computing platform that supports delivery of other types computing services—including servers, storage, databases, networking, and intelligence. A plurality of software development environment clients (e.g., software development environment client 130) include hardware or software that access the software development environment. Software environment client 130 can include an application (e.g., an integrated development environment) that provides facilities for software development. The plurality of software development environment clients can access computing components of the software development environment system via a network (e.g., network 100B) to perform computing operations.

The security management system 100A is designed to provide code security management services associated with detecting sensitive data leaks. The security management system 100A provides an integrated operating environment based on a security management framework of computing components associated with the software development process. In particular, the security management framework supports providing sensitive data leak detection operations during a development stage or testing stage of software application in a software development cycle. The security management system 100A integrates software development components with sensitive data leak detection components to automate onboarding (i.e., configuring) instances of in-development code in repositories—for performing sensitive data leak detection and executing sensitive data leak detection via the software development clients associated with in-development code. For example, a software development environment data store 120 (e.g., a code repository) can be integrated with a sensitive data leak-detection engine to provide the functionality described herein.

The sensitive data leak-detection engine 110 is responsible for providing sensitive data scanning. The sensitive data leak-detection engine communicates with software development environment components (e.g., software development environment data store 120) to provide sensitive data scanning. The software development environment data store 120 can refer to a code repository. The software development environment data store 120 (e.g., MICROSOFT AZURE repos) can include a set of version control tools that are used to manage code. The software development environment data store 120 can include functionality for testing or reviewing code (e.g., in-development code). For example, code can be tested with pull requests to make sure the code passes sensitive data scanning. The sensitive data scanning can specifically be provided during the development stage or testing stage of a software development process.

Figure 1B:
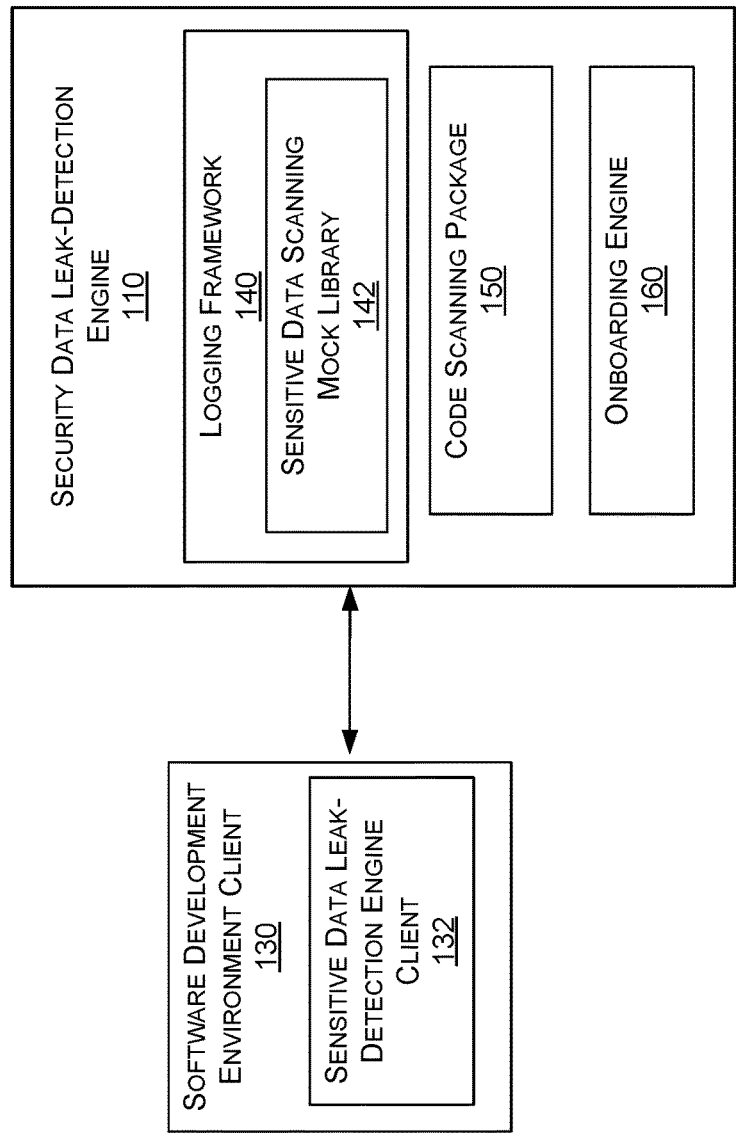

With reference to FIG. 1B, FIG. 1B illustrates sensitive data leak-detection engine 110—having logging framework 140 and sensitive data scanning mock library 142—code scanning package 150, onboarding engine 160; software development environment client 130 having security data leak-detection engine client 132.

Sensitive data leak-detection engine 110 provides a logging framework 140 that is designed to standardize logging operations associated with code. The logging framework 140 specifically includes sensitive data scanning mock library 142 developed to identify sensitive data leaks. For example, the sensitive data scanning mock library can support credential scanning to identify credential leaks in source code and configuration files. The logging framework 140 can support generating telemetry logging data that can be scanned to identify sensitive data leaks. The logging framework 140 and sensitive data scanning mock library 142 support developing a code scanning package that is used for sensitive data scanning. The software development environment client 130 can be on-boarded with a sensitive data leak-detection engine client (or sensitive data scanning onboarding code) that provides code for triggering sensitive data scanning via the code scanning package 150. For example, the sensitive data leak-detection engine client can be a code scanning package reference-code that is integrated into in-development code, such that, the code scanning package 150 is referenced for performing sensitive data scanning operations.

Sensitive data leak-detection engine 110 provides an onboarding engine 160 that automates onboarding or configuration of in-development code for sensitive data scanning. By way of illustration, the software development environment system 100 can include in-development code. The sensitive data leak-detection engine can identify in-development code to be scanned for sensitive data. The in-development code is identified based on different types of metadata attributes of the code to automatically onboard the in-development code for sensitive data scanning. For example, a metadata attribute can indicate that the in-development code is compatible with the logging framework such that the in-development code can scanned to identify sensitive data. An onboarding request (e.g., a pull request) can be automatically associated with a code repository that includes one or more instances of in-development code. A software developer (e.g., via a software development environment client 130) can approve the onboarding request, such that, the in-development code is configured for sensitive data scanning operations.

With reference to FIG. 1C, FIG. 1C illustrates a security management system interface 100C that illustrates automated onboarding based on a pull request. The security management system interface 100C can be associated with the software development environment client 130 and the software development environment store 120. The pull request description 102C describes functionality of sensitive data scanning. The pull request is automatically generated for in-development code associated with a repository in the software development environment store 120. A software developer—via the software development environment client 130—can approve the pull request to onboard the repository or in-development code for sensitive data scanning. Approving the request can cause communication of sensitive data scanning onboarding code that supports initializing a sensitive data leak-detection engine client on a software development client. The sensitive data scanning onboarding code and the sensitive data leak-detection engine client support access a code scanning package for perform sensitive data scanning operations.

Figure 1D:
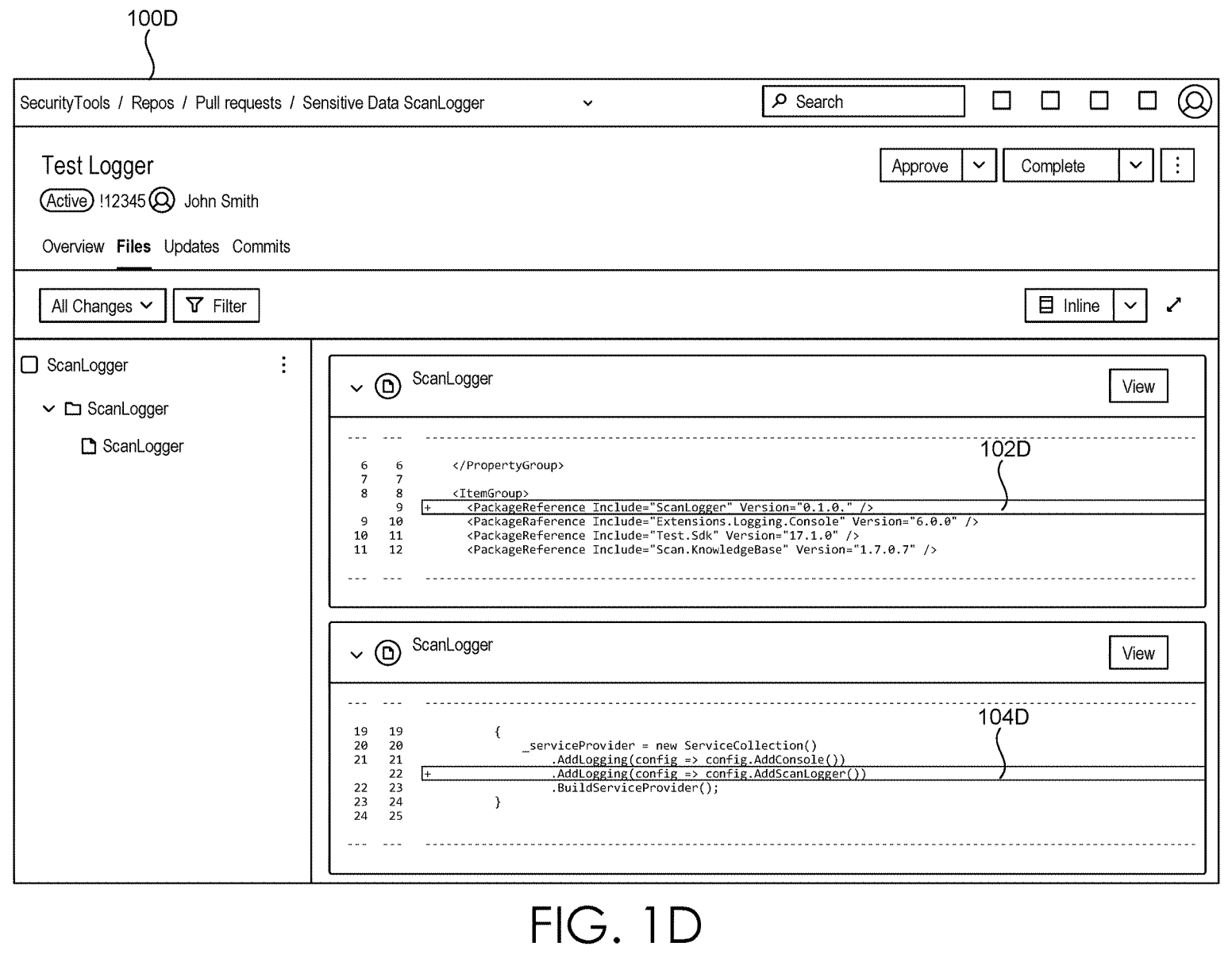

With reference to FIG. 1D, FIG. 1D illustrates a security management system interface 100D that illustrates onboarding in-development code for sensitive data scanning. In particular, the security management system interface 100D includes code scanning package reference-code 102D and code scanning package reference-code 104D that are integrated into in-development code, such that, the code scanning package is referenced for performing sensitive data scanning. The code scanning package can include information for implementing the logging framework for executing code scanning.

Figure 1E:
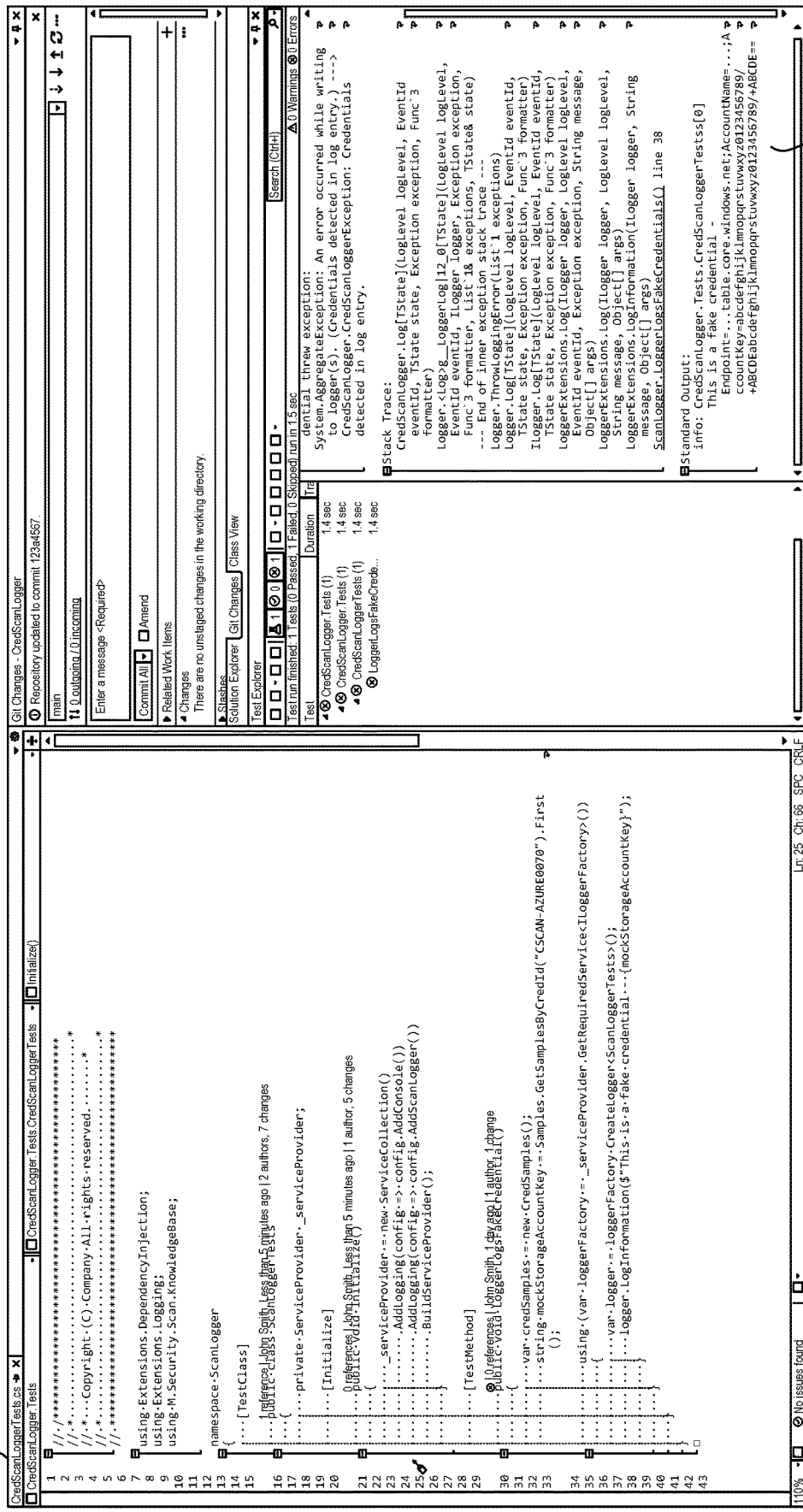

With reference to FIG. 1E, FIG. 1E illustrates a security management system interface 100E that illustrates a notification 102E that includes a sensitive data scan result. The security management system interface 100E includes a sensitive data scan result from executing the sensitive data scan on in-development code. The notification 102E is communicated—from the sensitive data leak-detection engine—to the software development client 130 that causes presentation of the notification 102E on the security management interface 100E.

Figure 2A:
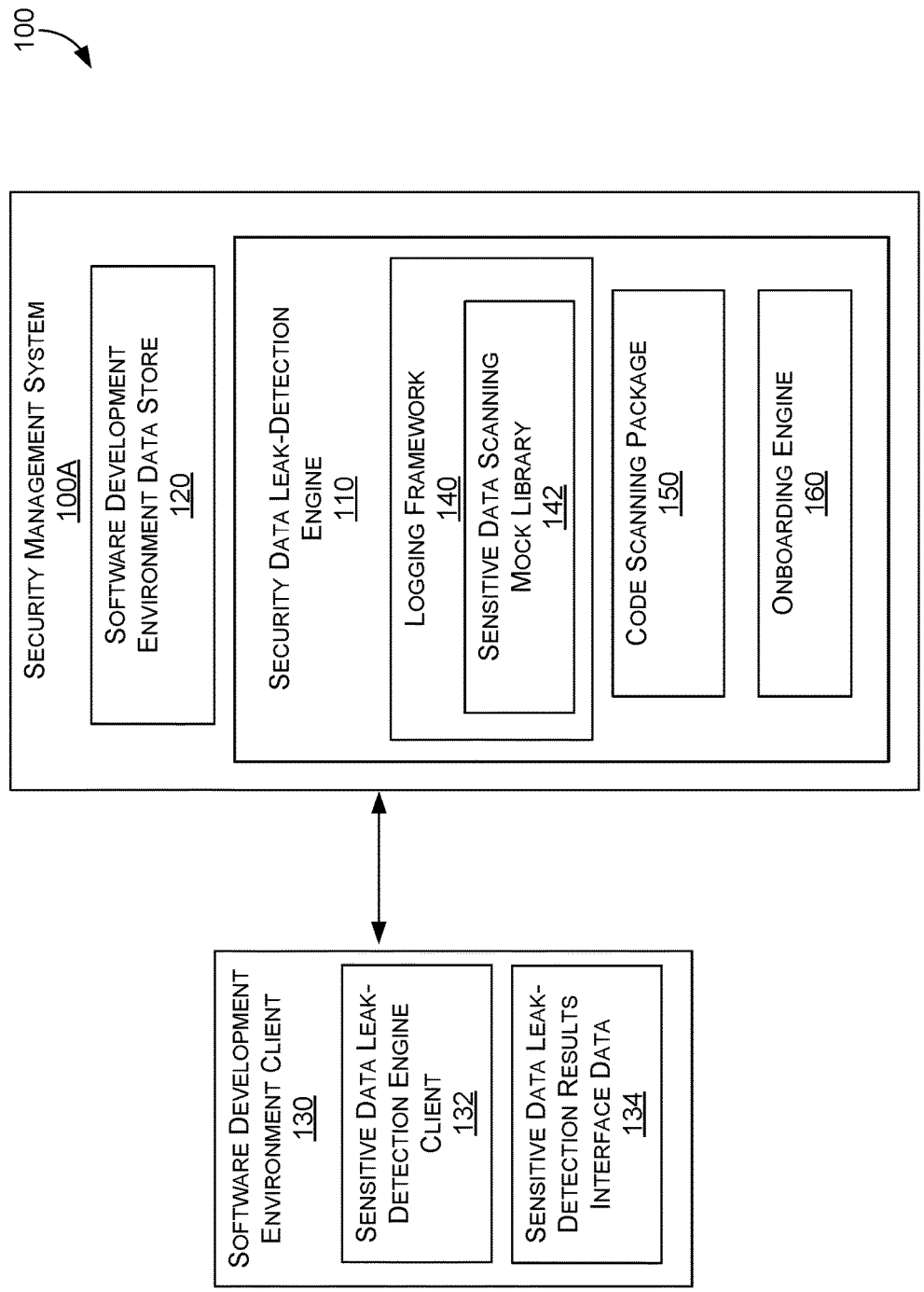
FIG. 2A is a block diagram of an exemplary security management system for providing sensitive data scanning in sensitive data leak-detection engine, in accordance with aspects of the technology described herein.
Figure 2B:
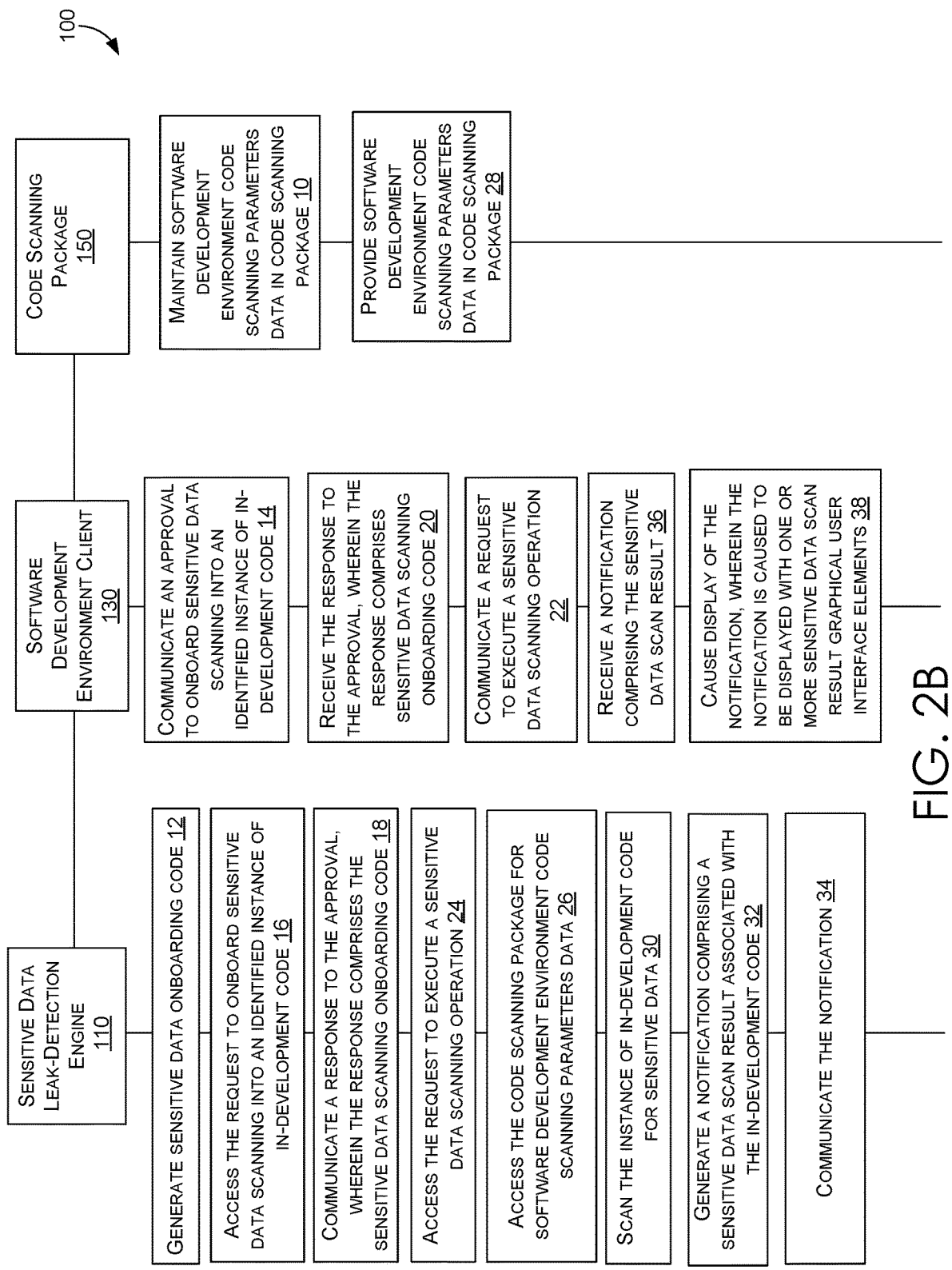
FIG. 2B is a block diagram of an exemplary security management system for providing sensitive data scanning in a sensitive data leak-detection engine, in accordance with aspects of the technology described herein.

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example software development environment system 100 in which methods of the present disclosure may be employed. In particular, FIG. 2A shows a high level architecture of the software development environment system 100 in accordance with implementations of the present disclosure. Among other engines, managers, generators, selectors, or components not shown (collectively referred to herein as "components"), the technical solution software development environment system 100 corresponds to FIGS. 1A and 1B.

With reference to FIG. 2A, FIG. 2A illustrates a security management system 100A having sensitive data leak-detection engine 110, software development environment client 130, code scanning package data 150, and onboarding engine 160. The security data leak-detection engine 110 further includes logging framework 140 and sensitive data scanning mock library 142; and the software development environment client 130 includes sensitive data leak-detection engine client 132 and sensitive data leak-detection results interface data 134.

Operationally, the sensitive data leak-detection engine 110 accesses a request to execute a sensitive data operation. The request can be received from a software development environment client. The sensitive data leak-detection engine 110 provides code security management services in the software development environment system 100. The code security management services include generating a code scanning package configured to scan in-development code for sensitive data; automatically onboarding instances of in-development code in a software development environment data store for sensitive data scanning; and scanning the instances of in-development code for sensitive data—during a development stage or testing stage of a software development process associated with the software development environment.

The sensitive data leak-detection engine 110 accesses the code scanning package 150. The code scanning package is generated—using the sensitive data leak-detection engine 110—based on a logging framework having a sensitive data scanning mock library. The code scanning package includes software development code scanning parameters that support scanning of the in-development code via a software development environment data store. For example, the software development code scanning parameters can identify the in-development code repository; identify types of sensitive data that are scanned; map in-development code meta attributes to code scanning parameters; and include features of the logging framework that support sensitive data scanning. Other variations and combination of code scanning parameters are contemplated with embodiments described herein.

The sensitive data leak-detection engine 110 scans the instance of in-development code for sensitive data. Scanning the instance of in-development code for sensitive data can include executing a unit testing feature of the software development environment. In particular, based on the repository or the in-development code being on-boarded for sensitive data scanning, testing features of the development stage or testing stage of a software development environment can be bootstrapped with sensitive data scanning functionality. For example, the unit testing feature executes a call to the code scanning package based on a code scanning package reference-code added to the instance of in-development code.

The sensitive data leak-detection engine 110 further generates a notification comprising a sensitive data scan result associated with the in-development code and communicates the notification. The notification can be caused to be displayed via a security management system interface, the notification comprising the sensitive data scan result indicating an exception associated with a credential. The notification can be associated with sensitive data leak-detection interface data 134. The sensitive data leak-detection interface data can include graphical user interface elements that whether a sensitive data leak has been detected. The graphical user interface elements can be associated with a GUI of the software development environment client in a development stage or testing stage such that testing features of the software development environment client are bootstrapped for performing sensitive data scanning operations and providing notifications on the results of the sensitive data scanning operations. In one example, the notification identifying a sensitive data leak or a credential leak is provided as an exception via the GUI of the software development environment client. Other variations and combinations of interfaces for providing notifications are contemplated with embodiments described herein.

With reference to FIG. 2B, FIG. 2B illustrates a software development environment having sensitive data leak-detection engine 110, software development environment client 130, and code scanning package data 150. At block 10, the code scanning package 130 maintains software development code scanning parameters data. The code scanning package 130 can be generated—via the sensitive data leak-detection engine 110—based on a logging framework having a sensitive data scanning mock library. At block 12, the sensitive data leak-detection engine 110 generates sensitive data onboarding code. The sensitive data onboarding code can be generated based on the code scanning package including the software development environment code scanning parameters data.

At block 14, the software development environment client 130 communicates an approval to onboard sensitive data scanning into an identified instance of in-development code. At block 18, the sensitive data leak-detection engine communicates a response to the approval, the response comprises the sensitive the sensitive data scanning onboarding code. At block 20, the software development environment client receives the response to the approval, the response comprises sensitive data scanning onboarding code, and at block 22, communicates a request to execute a sensitive data scanning operation.

At block 24, the sensitive data leak-detection engine 110, accesses the request to execute the sensitive data scanning operation; and at block 26, the sensitive data leak-detection engine accesses the code scanning package for software development environment code parameters. At block 28, the code scanning package 105, provides software development environment code scanning parameters data in code scanning package. At block 30, the sensitive data leak-detection engine 110, scans the instance of in-development code for sensitive data; at block 32, generates a notification comprising a sensitive data scan result associated with the in-development code; and at block 34, communicates the notification. At block 36, the software development environment client 130, receives a notification comprising the sensitive data scan result; and at block 38, causes display of the notification.

Example Methods

Figure 3:
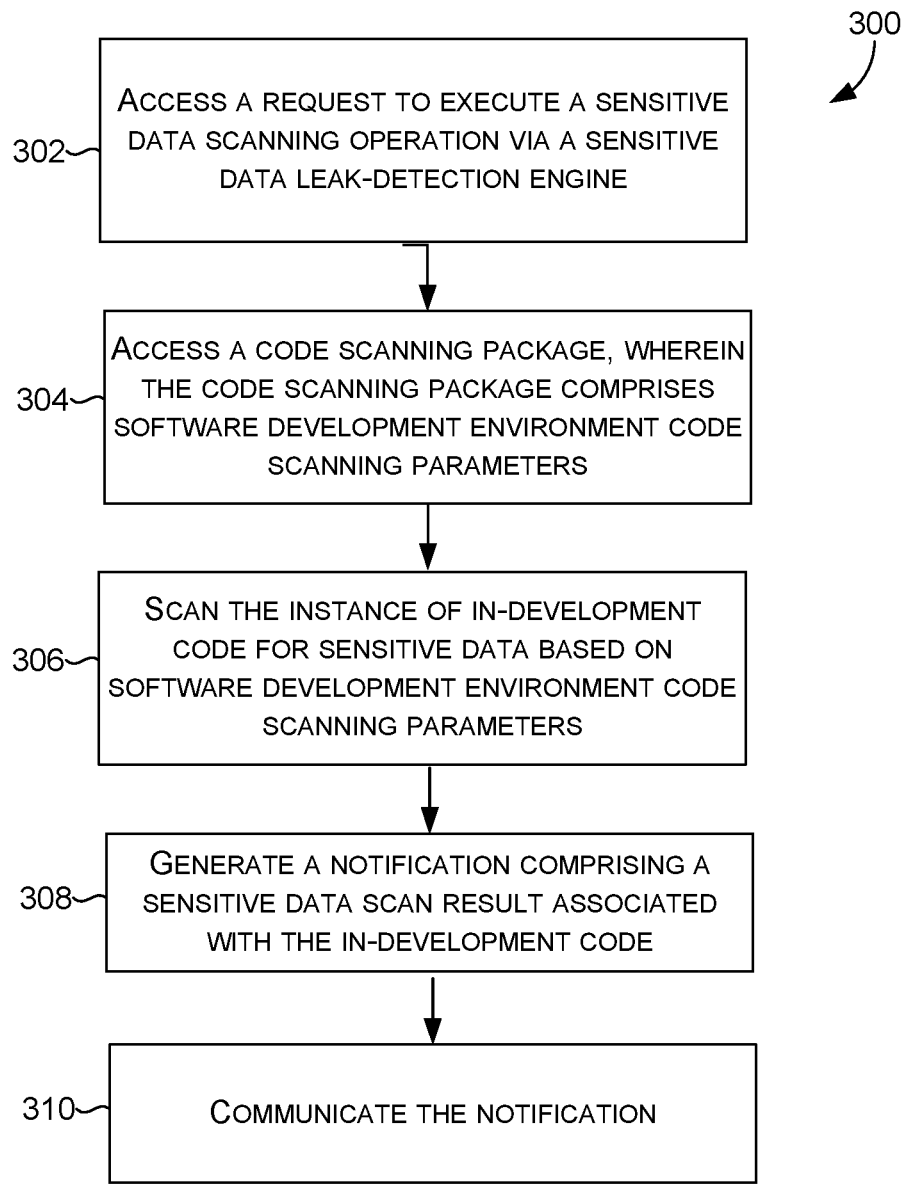
FIG. 3 provides a first exemplary method of providing sensitive data scanning in a sensitive data leak-detection engine, in accordance with aspects of the technology described herein.
Figure 4:
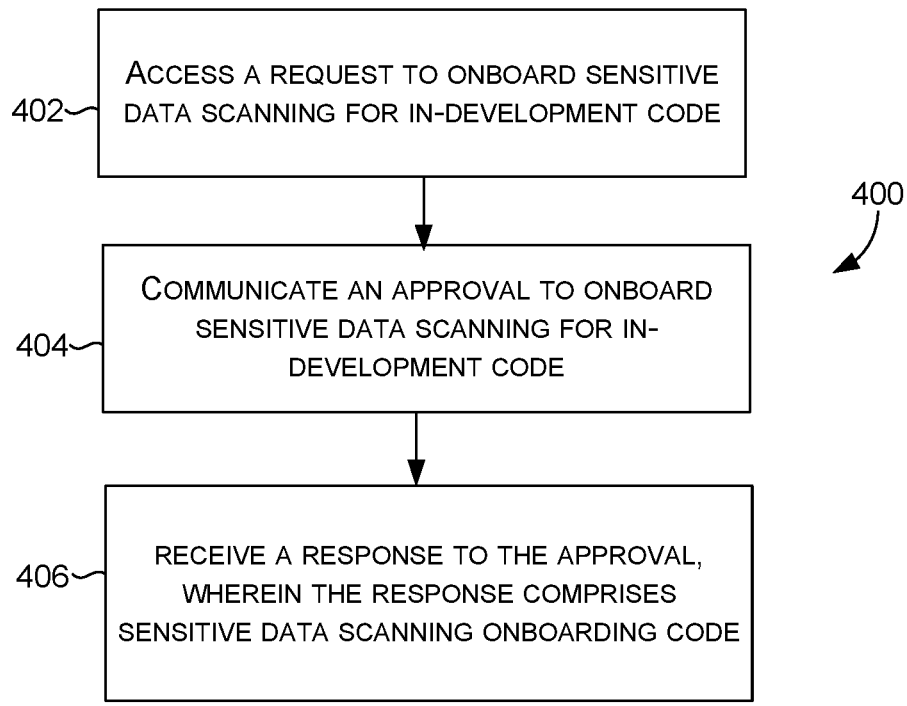
FIG. 4 provides a second exemplary method of providing sensitive data scanning in a sensitive data leak-detection engine, in accordance with aspects of the technology described herein.
Figure 5:
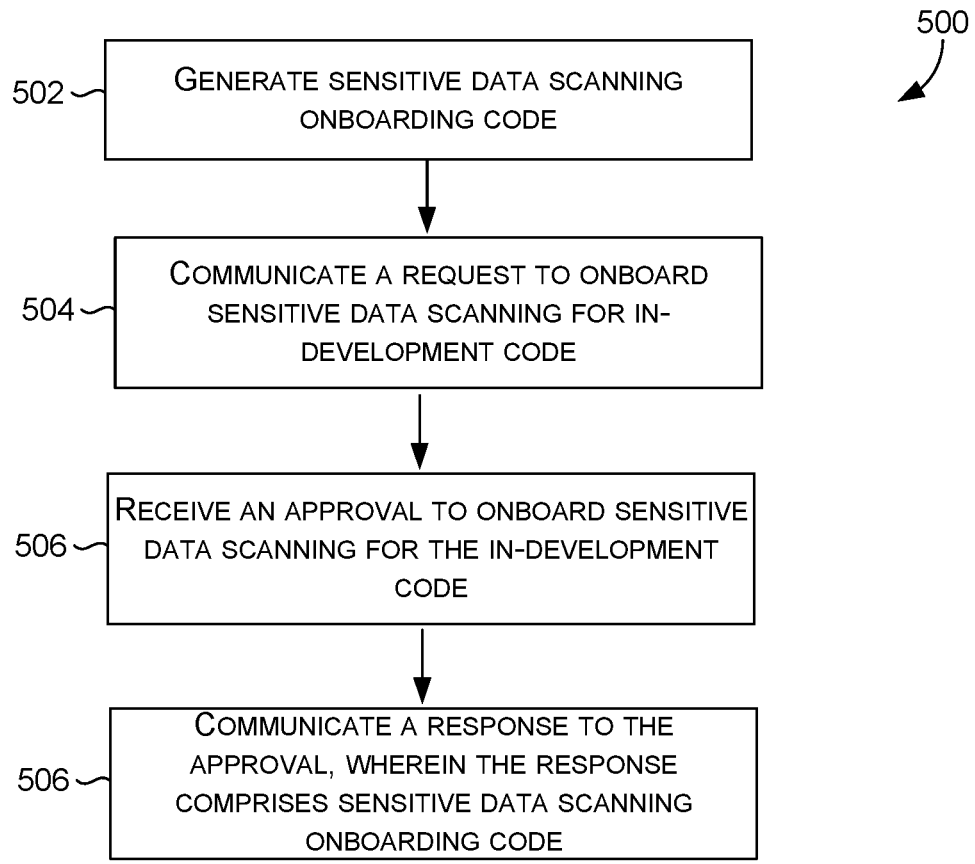
FIG. 5 provides a third exemplary method of providing sensitive data scanning in a sensitive data leak-detection engine, in accordance with aspects of the technology described herein.

With reference to FIGS. 3, 4, and 5, flow diagrams are provided illustrating methods for providing sensitive data scanning in a sensitive data leak-detection engine in a security management system. The methods may be performed using the security management system described herein. In embodiments, one or more computer-storage media having computer-executable or computer-useable instructions embodied thereon that, when executed, by one or more processors can cause the one or more processors to perform the methods (e.g., computer-implemented method) in the security management system (e.g., a computerized system or computing system).

Turning to FIG. 3, a flow diagram is provided that illustrates a method 300 for providing sensitive data scanning in a sensitive data leak-detection engine in a security management system. At block 302, access a request to execute a sensitive data scanning operation via a sensitive data leak-detection engine. At block 304, access a code scanning package, the code scanning package comprises software development environment code scanning parameters. At block 305, scan the instance of in-development code for sensitive data based on software development environment code scanning parameters. At block 308, generate a notification comprising a sensitive data scan results associated with the in-development code. At block 310, communicate the notification to cause display of the notification.

Turning to FIG. 4, a flow diagram is provided that illustrates a method 400 for providing sensitive data scanning in a sensitive data leak-detection engine in a security management system. At block 402, access a request to onboard sensitive data scanning for in-development code. At block 404, communicate an approval to onboard sensitive data scanning for the in-development code. At block 406, receive a response to the approval, the response comprises sensitive data scanning onboarding code.

Turning to FIG. 5, a flow diagram is provided that illustrates a method 500 for providing sensitive data scanning in a sensitive data leak-detection engine in a security management system. At block 502, generate sensitive data scanning onboarding code. At block 504, communicate a request to onboard sensitive data scanning for in-development code. At block 506, communicate a response to the approval, the response comprises sensitive data scanning onboarding code.

Technical Improvement

Embodiments of the present invention have been described with reference to several inventive features (e.g., operations, systems, engines, and components) associated with a security management system. Inventive features described include: operations, interfaces, data structures, and arrangements of computing resources associated with providing the functionality described herein relative with reference to a sensitive data leak-detection engine. Functionality of the embodiments of the present invention have further been described, by way of an implementation and anecdotal examples—to demonstrate that the operations for providing the virtual lab virtual machine network as a solution to a specific problem in security management technology to improve computing operations in security management systems. Overall, these improvements result in less CPU computation, smaller memory requirements, and increased flexibility in security management systems when compared to previous conventional security management system operations performed for similar functionality.

ADDITIONAL SUPPORT FOR DETAILED DESCRIPTION OF THE INVENTION

Example Distributed Computing System Environment

Figure 6:
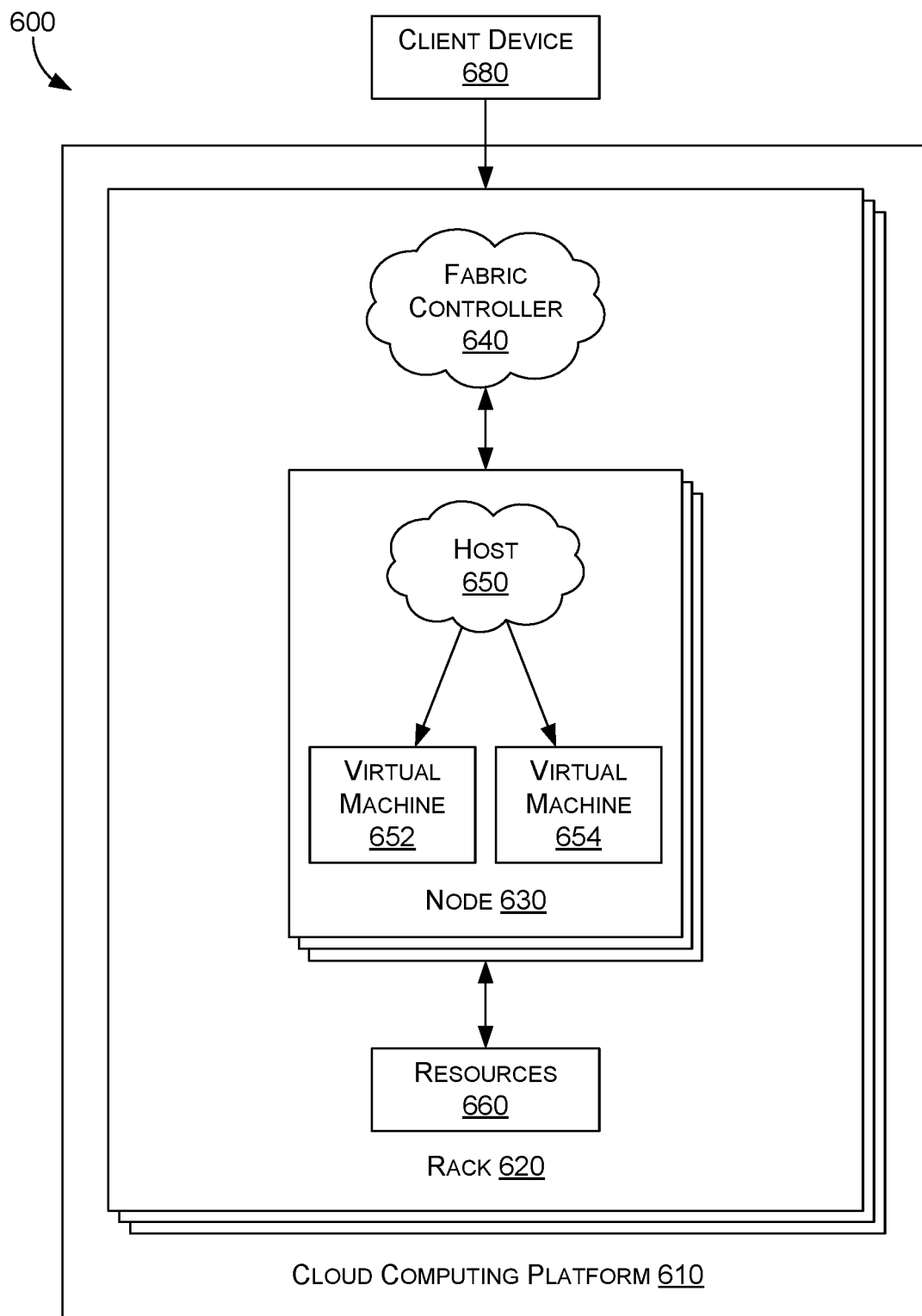
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Computing Environment

Having briefly described an overview of embodiments of the present invention, an example operating environment in which embodiments of the present invention may be implemented is described below in order to provide a general context for various aspects of the present invention. Referring initially to FIG. 6 in particular, an example operating environment for implementing embodiments of the present invention is shown and designated generally as computing device 600. Computing device 600 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 7:
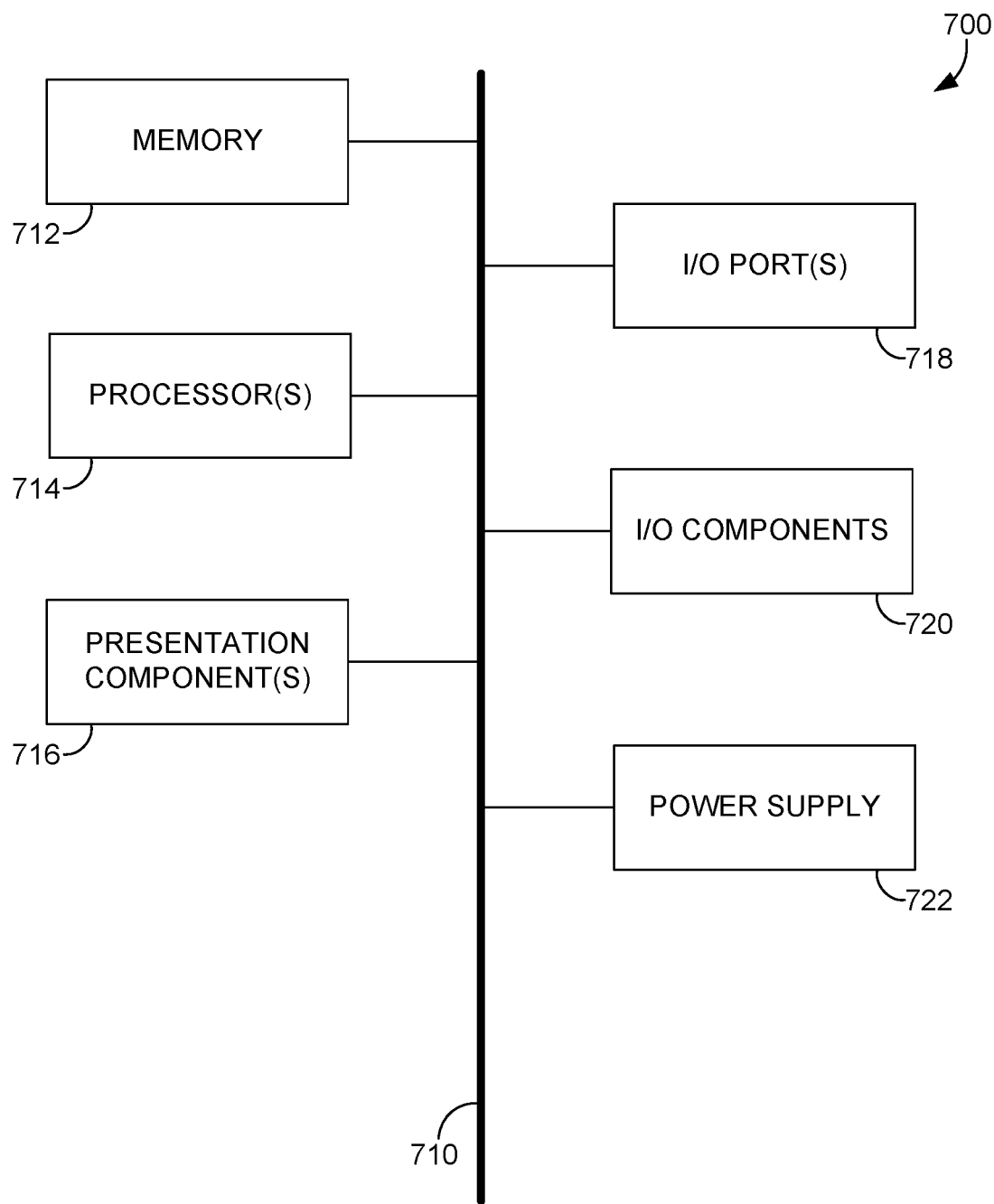
FIG. 7 is a block diagram of an exemplary computing environment suitable for use in implementing aspects of the technology described herein.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
one or more computer processors; and
computer memory storing computer-useable instructions that, when used by the one or more computer processors, cause the one or more computer processors to perform operations, the operations comprising:
accessing a request to execute a sensitive data scanning operation on an instance of in-development code, wherein the instance of in-development code is on-boarded for sensitive data scanning, the sensitive data scanning operation executable via a sensitive data leak-detection engine that provides code security management services, the sensitive data leak-detection engine is integrated into a unit testing feature of a software development environment;
accessing a code scanning package, wherein the code scanning package comprises software development environment code scanning parameters;
based on the software development environment code scanning parameters, scanning the instance of in-development code for sensitive data, wherein scanning the instance of in-development code comprises the unit testing feature executing a call to the code scanning package based on a code scanning package reference-code added to the instance of in-development code;
generating a notification comprising a sensitive data scan result associated with the in-development code; and
communicating the notification.

2. The system of claim 1, wherein the code security management services comprise:
generating the code scanning package configured to scan in-development code for sensitive data;
automatically onboarding instances of in-development code in a software development environment data store for sensitive data scanning; and
scanning the instances of in-development code for sensitive data during a development stage or testing stage of a software development process associated with the software development environment.

3. The system of claim 1, wherein the code scanning package is generated based on a logging framework comprising a sensitive data scanning mock library, the code scanning package comprising the software development code scanning parameters that support scanning of the in-development code via a software development environment data store.

4. The system of claim 1, wherein the notification is caused to be displayed via a security management system interface, the notification comprising the sensitive data scan result indicating an exception associated with a credential.

5. The system of claim 1, wherein the in-development code is on-boarded for sensitive data scanning, where the in-development code is stored in a software development environment data store that provides a repository for a plurality of instances of in-development code.

6. The system of claim 1, wherein a software development environment data store and instances of in-development code in the software development environment data store are associated with metadata attributes that describe features of the in-development code and the software development environment data store, wherein the metadata attributes are used for selecting the instances of in-development code for onboarding operations.

7. The system of claim 1, wherein the unit testing feature executes the call to the code scanning package based on the code scanning package reference-code added to the instance of in-development code.

8. The system of claim 1, the operations further comprising:
communicating a request to onboard sensitive data scanning for in-development code;
receiving approval to onboard sensitive data scanning for the in-development code; and
communicating a response to the approval, wherein the response comprises sensitive data scanning onboarding code that causes initialization of a reference the code scanning package for executing the sensitive data scanning operation.

9. The system of claim 1, the operations further comprising:
receiving a request to onboard sensitive data scanning for one or more instances of in-development code;
communicating approval to onboard the one or more instances of in-development code; and
receiving a response to the approval, wherein the response comprises sensitive data scanning onboarding code.

10. The system of claim 1, the operations further comprising:

communicating, from a client of the software development environment, the request to execute the sensitive data scanning operation;

based on communicating the request, receiving the notification comprising the sensitive data scan result; and causing display of the notification, wherein the notification is caused to be displayed with one or more sensitive data scan result graphical user interface elements.

11. One or more computer-storage media having computer-executable instructions embodied thereon that, when executed by a computing system having a processor and memory, cause the processor to perform operations, the operations comprising:

accessing a request to execute a sensitive data scanning operation on an instance of in-development code, wherein the instance of in-development code is onboarded for sensitive data scanning, the sensitive data scanning operation executable via a sensitive data leak-detection engine that provides code security management services, the sensitive data leak-detection engine is integrated into a unit testing feature of a software development environment;

accessing a code scanning package, wherein the code scanning package comprises software development environment code scanning parameters;

based on the software development environment code scanning parameters, scanning the instance of in-development code for sensitive data, wherein scanning the instance of in-development code comprises the unit testing feature executing a call to the code scanning package based on a code scanning package reference-code added to the instance of in-development code;

generating a notification comprising a sensitive data scan result associated with the in-development code; and communicating the notification.

12. The media of claim 11, wherein the code security management services comprise:

generating the code scanning package configured to scan in-development code for sensitive data;

automatically onboarding instances of in-development code in a software development environment data store for sensitive data scanning; and scanning the instances of in-development code for sensitive data during a development stage or testing stage of a software development process associated with the software development environment.

13. The media of claim 11, wherein the code scanning package is generated based on a logging framework comprising a sensitive data scanning mock library, the code scanning package comprising software development code scanning parameters that support scanning of the in-development code via a software development environment data store.

14. The media of claim 11, wherein the notification is caused to be displayed via a security management system interface, the notification comprising the sensitive data scan result indicating an exception associated with a credential.

15. The media of claim 8, the operations further comprising:

communicating a request to onboard sensitive data scanning for in-development code;

receiving approval to onboard sensitive data scanning for the in-development code; and communicating a response to the approval, wherein the response comprises sensitive data scanning onboarding code that causes initialization of a reference the code scanning package for executing the sensitive data scanning operation.

16. A computer-implemented method, the method comprising:

accessing a request to execute a sensitive data scanning operation on an instance of in-development code, wherein the instance of in-development code is onboarded for sensitive data scanning, the sensitive data scanning operation executable via a sensitive data leak-detection engine that provides code security management services, the sensitive data leak-detection engine is integrated into a unit testing feature of a software development environment;

accessing a code scanning package, wherein the code scanning package comprises software development environment code scanning parameters;

based on the software development environment code scanning parameters, scanning the instance of in-development code for sensitive data, wherein scanning the instance of in-development code comprises the unit testing feature executing a call to the code scanning package based on a code scanning package reference-code added to the instance of in-development code;

generating a notification comprising a sensitive data scan result associated with the in-development code; and communicating the notification.

17. The method of claim 16, wherein the code security management services comprise:

generating the code scanning package configured to scan in-development code for sensitive data;

automatically onboarding instances of in-development code in a software development environment data store for sensitive data scanning; and scanning the instances of in-development code for sensitive data during a development stage or testing stage of a software development process associated with the software development environment.

18. The method of claim 16, wherein the code scanning package is generated based on a logging framework comprising a sensitive data scanning mock library, the code scanning package comprising software development code scanning parameters that support scanning of the in-development code via a software development environment data store.

19. The method of claim 16, wherein the notification is caused to be displayed via a security management system interface, the notification comprising the sensitive data scan result indicating an exception associated with a credential.

20. The method of claim 16, the method further comprising:

communicating a request to onboard sensitive data scanning for in-development code;

receiving approval to onboard sensitive data scanning for the in-development code; and communicating a response to the approval, wherein the response comprises sensitive data scanning onboarding code that causes initialization of a reference the code scanning package for executing the sensitive data scanning operation.

* * * * *